United States Patent [19]

Litz

[11] Patent Number: 4,509,561
[45] Date of Patent: Apr. 9, 1985

[54] INSULATION DEVICE FOR APPLICATION TO AN UNINSULATED PORTION OF A PREINSULATED PIPE

[75] Inventor: Milton B. Litz, Pittsburgh, Pa.

[73] Assignee: Power Piping Company, Pittsburgh, Pa.

[21] Appl. No.: 489,458

[22] Filed: Apr. 28, 1983

[51] Int. Cl.³ .............................................. F16L 9/14
[52] U.S. Cl. ................................. 138/149; 138/157; 138/120; 138/161
[58] Field of Search ............... 138/100, 101, 120, 128, 138/137, 140, 149, 151, 155, 156, 157, 158, 164, 172, 174, 177, 178, 161; 285/48, 47, 50, 49; 277/65, 81 S

[56] References Cited

U.S. PATENT DOCUMENTS

| 3,081,098 | 3/1963 | Stephens | 277/81 S |
|---|---|---|---|
| 3,453,716 | 7/1969 | Cook | 138/149 X |
| 4,025,091 | 5/1977 | Zeile | 138/149 X |
| 4,219,225 | 8/1980 | Sigmund | 285/47 |
| 4,221,405 | 9/1980 | Stonitsch et al. | 285/53 |
| 4,294,454 | 10/1981 | Cannings | 277/65 |

FOREIGN PATENT DOCUMENTS

| 2426752 | 12/1975 | Fed. Rep. of Germany | 138/149 |
| 2050533 | 3/1971 | France | 138/149 |
| 38172 | 10/1923 | Norway | 138/149 |
| 26465 | of 1905 | United Kingdom | 138/149 |
| 1335055 | 10/1973 | United Kingdom | 285/47 |

Primary Examiner—James E. Bryant, III
Attorney, Agent, or Firm—Robert D. Yeager; Christine Ethridge

[57] ABSTRACT

An insulation device for surrounding the uninsulated, adjoining end portions of a preinsulated pipe comprising a plurality of axially extending cylinder segments adapted to be circumferentially joined to form a cylindrical insulating jacket around the uninsulated end portions. The cylinder segments in their undeformed states have a length slightly greater than the combined length of the uninsulated adjoining end portions. The cylindrical insulating jacket has an inside diameter generally conforming to the outside diameter of the uninsulated end portions and an outside diameter generally conforming to the outside diameter of the preinsulated pipe. Each cylinder segment has at least a first pair of rigid arcuate sections and a first resilient arcuate section sandwiched therebetween. The first resilient arcuate sections of all of the cylinder segments are longitudinally positioned in the cylindrical jacket to fall substantially in the same transverse plane.

13 Claims, 6 Drawing Figures

INSULATION DEVICE FOR APPLICATION TO AN UNINSULATED PORTION OF A PREINSULATED PIPE

BACKGROUND OF THE INVENTION

1. Field of the Invention

This invention relates to insulation devices for pipes; more particularly, to an insulation device for surrounding the uninsulated, adjoining end portions of preinsulated pipe.

2. Description of the Prior Art

Above-ground and undersea pipeline systems have assumed increased importance, particularly in the oil and gas industry where it is necessary to transport fluids from well-heads located in remote, extremely cold regions, such as Alaska, to seaports or processing facilities. Often sea water likewise is transported by pipeline to a well-head to replace extracted oil and gas, and thereby maintain pressure. In these circumstances, a buried pipeline is impractical because the pipeline must traverse the earth's permafrost layer which remains frozen. The fact that a pipeline is above-ground often means that the fluid being transported is at a temperature substantially higher than ambient temperature; therefore, the pipeline must be insulated to prevent undue heat loss from the fluid during transport and consequence viscosity increase. Furthermore, if the pipeline were not insulated, the heat generated by the transported fluid would melt the permafrost layer.

A common technique for insulating pipelines is to apply rigid polyurethane foam to the exterior of steel pipe sections before they are delivered to the field for installation. Typically, such pipe sections are fabricated in lengths of twenty or forty feet with about nine inches of bare pipe exposed at each end to permit the welding of adjoining ends without melting any preapplied polyurethane foam adjacent the ends. This means that after installation, a short length of the pipeline, say about eighteen inches, spanning the weldment joining the pipe sections remains uninsulated.

In ordinary climates, the uninsulated portion of the pipeline left after installation would be insulated by pouring polyurethane foam into a mold surrounding the uninsulated portion or by spraying such foam onto that portion. These application methods require, however, ambient temperatures of +40° F. or above and such temperatures exist in many of the cold regions in question only for about one month each year. Further, these application methods may not be used during conditions of high humidity. At the present time, therefore, the adjoining ends of an entire length of pipeline may remain uninsulated for an extended period before conditions permit the foam application techniques just discussed. There exists, therefore, a need for some means of applying insulation to the uninsulated joints of a preinsulated pipeline immediately after the pipeline is installed and tested, regardless of ambient temperature or humidity.

SUMMARY OF THE INVENTION

The present invention provides a convenient, relatively inexpensive means for surrounding the uninsulated end portions of preinsulated pipe with insulation following the welding of those end portions and the testing of the weld. Further, the invention requires no elaborate or costly installation procedures or equipment and may be used at any ambient temperature and humidity.

The present invention provides an insulation device for surrounding the uninsulated, adjoining end portions of a preinsulated pipe comprising a plurality of axially extending cylinder segments adapted to be circumferentially joined to form a cylindrical insulating jacket around the uninsulated end portions. The cylinder segments in their undeformed states have a length slightly greater than the combined length of the uninsulated adjoining end portions. The cylindrical insulating jacket has an inside diameter generally conforming to the outside diameter of the uninsulated end portions and an outside diameter generally conforming to the outside diameter of the preinsulated pipe. Each cylinder segment has at least a first pair of rigid arcuate sections and a first resilient arcuate section sandwiched therebetween. The first resilient arcuate sections of all of the cylinder segments are longitudinally positioned in the cylindrical jacket to fall substantially in the same transverse plane.

BRIEF DESCRIPTION OF THE DRAWINGS

For a better understanding of the invention, reference may be had to the following description of the preferred embodiments exemplary of the invention taken with the accompanying drawings in which.

DETAILED DESCRIPTION OF THE PREFERRED EMBODIMENTS

The preferred material for use in the present invention is polyurethane foam, a material well known to persons skilled in the art to be moldable into useful shapes having a range of densities and a corresponding range of insulating ("K") factors. Depending on the particular application of the present invention, persons skilled in the art will adjust the density of the polyurethane foam to achieve the needed strength and insulating parameters. Reference will be made herein to "rigid" material; in the case of polyurethane foam, "rigid" means a closed-cell material. Reference also will be made to "resilient" material; in the case of polyurethane foam, "resilient" means an open-cell material capable of deformation and having the tendency after deformation to resume its original shape.

Figure 1:
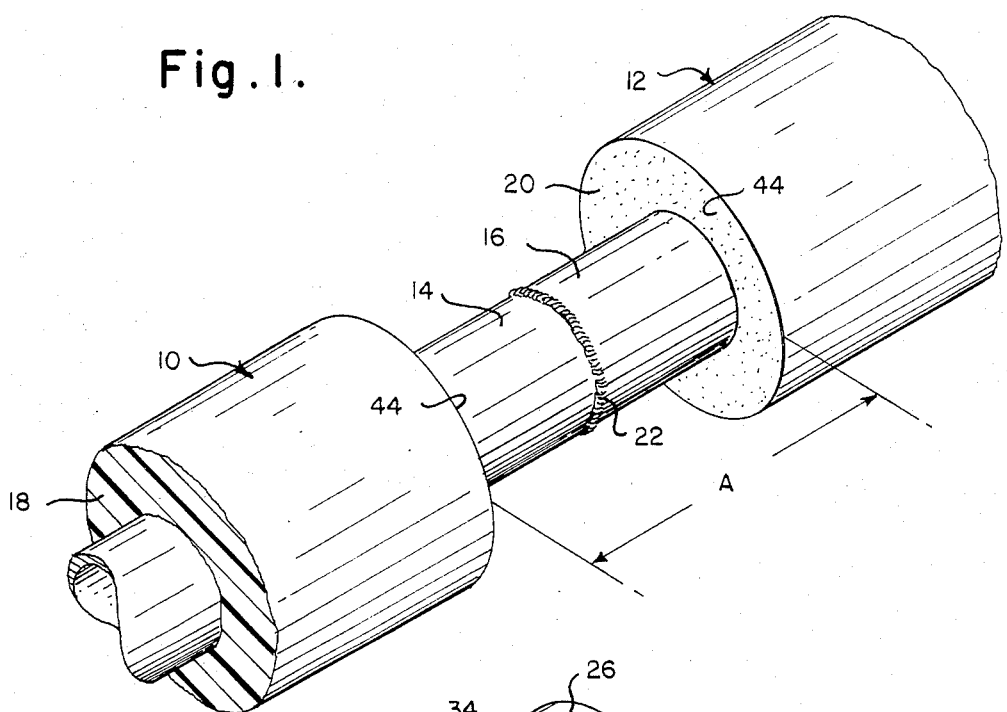
FIG. 1 is a fragmentary isometric view of the welded end portions of two sections of preinsulated pipe.

Referring now to the drawings, particularly to FIG. 1, there is shown two lengths 10 and 12 of preinsulated pipe. Typically, pipes 10, 12 are coated to within nine inches of each end portion 14, 16 with polyurethane foam 18, 20; such pipe is well known and will be referred to hereinafter as "preinsulated pipe" in that the pipe is delivered to the field in that condition.

To form a pipeline, the uninsulated end portions 14, 16 are joined by a weldment 22 at the junction defined by the joinder of end portions 14 and 16. After installation, there remains, therefore, a section of pipe having a length indicated by the letter A that is not insulated and subject to the exterior environment. The present invention is intended to be inserted into the uninsulated section of pipe across the distance A.

Figure 2:
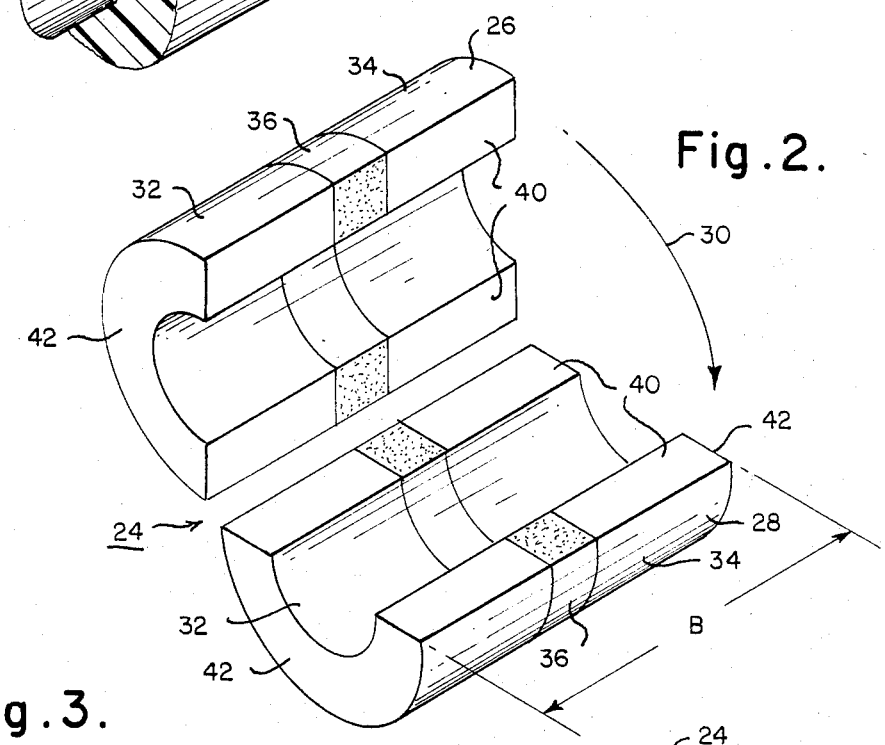
FIG. 2 is an exploded isometric view of one embodiment of the present invention.
Figure 3:
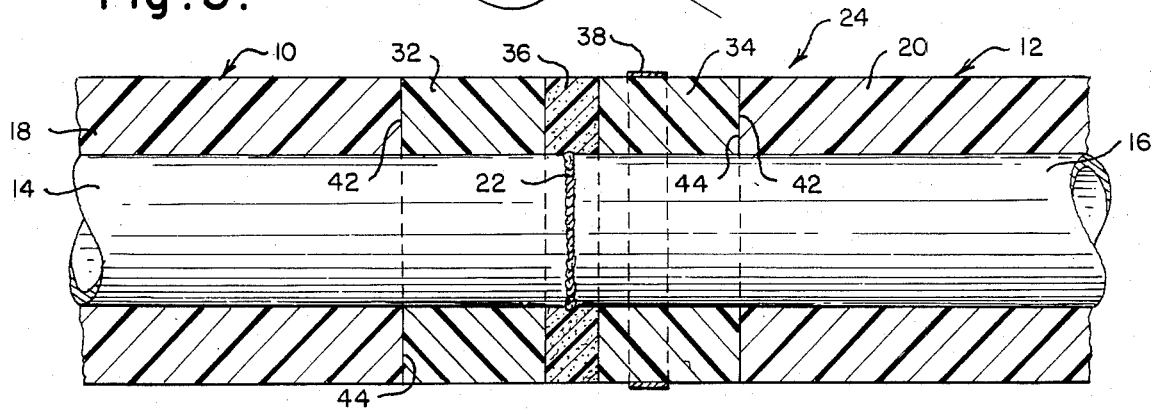
FIG. 3 is a side elevational view, partly in section, of the insulation device of FIG. 2 in place on joined sections of preinsulated pipe and after the top portion of the device is moved in the direction of the arrow in FIG. 2.

Referring now to FIGS. 2 and 3, there is shown one embodiment of the present invention comprising a cylinder which is designated generally by the reference numeral 24. Cylinder 24 consists of a plurality of axially extending segments of a cylinder (referred to hereinafter and in the claims as "cylinder segments"). In the embodiment depicted in FIGS. 2 and 3, there are two cylinder segments 26, 28, each being a 180° section, which are joined in longitudinal abutting relationship as indicated by the arrow 30 along the opposing longitudinally extending parting lines. Each cylinder segment 26, 28 includes three sections 32, 34, 36. Sections 32 and 34 of cylinder segment 26 are constructed of rigid molded polyurethane foam and are identically reproduced in cylinder segment 28 in diametrically opposed relationship. Sandwiched between rigid sections 32 and 34 is a resilient section 36 which is constructed of resilient polyurethane foam. Sections 32 and 34 are joined to section 36 by means of a rubber-based adhesive. Resilient sections 36 of cylinder segments 26, 28 likewise are diametrically opposed. As best shown in FIG. 3, resilient sections 36 are positioned to overlie weldment 22 and thereby allow for any circumferential deviation of the pipe caused by weldment 22.

Cylinder segments 26, 28 are constructed to have a length B (see FIG. 2) which is slightly greater than length A discussed above. At the time of installation, each cylinder segment 26, 28 is longitudinally compressed to a length slightly less than length A and inserted into position surrounding uninsulated pipe end portions 14, 16. The axial compression of each cylinder segment is made possible by the presence of a resilient section 36.

The exterior surface of cylinder 24 is coated with a rubber-based coating to protect it against the adverse effects of moisture. This coating is necessary to close the exposed open cells of resilient sections 36 against moisture penetration. Cylinder 24 also may be fitted with a metal jacket to conform with the pipeline. The presence of resilient section 36 also supplies outwardly directed spring forces to hold the cylinder segment in place prior to completion of the installation of the present invention.

Figure 6:
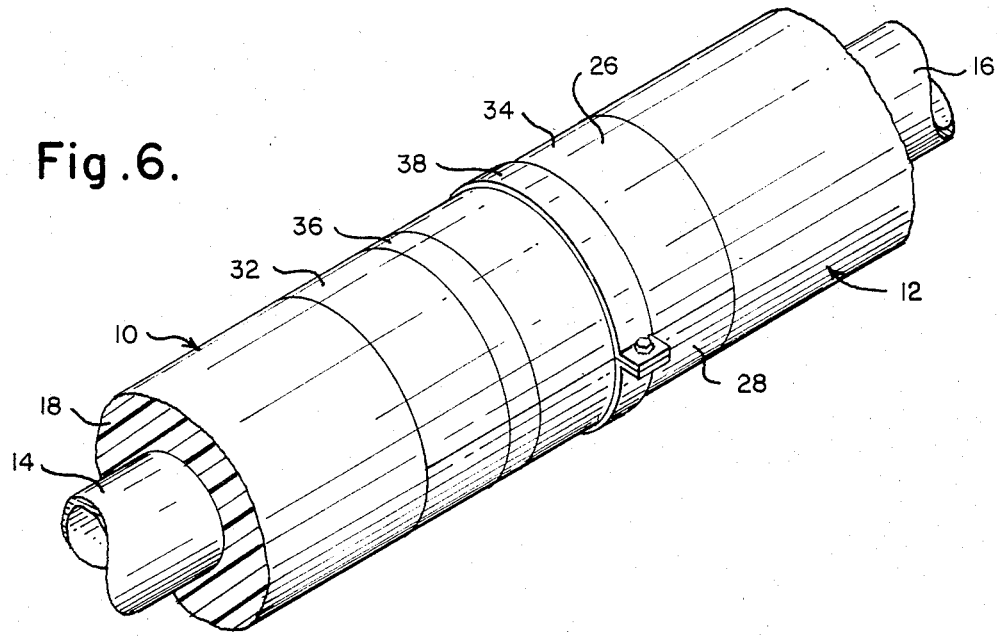
FIG. 6 is a fragmentary isometric view of the insulating device of either embodiment secured in place on an insulated pipeline.

The end surfaces 42 of cylinder 24 are coated with a polyurethane coating. After cylinder 24 is in place, cylinder segments 26, 28 are secured by a metal band 38 as shown in FIGS. 3 and 6.

It may be seen that the resilient means included in cylinder 24 not only affords ease of installation, but also allows cylinder 24 to serve in effect as an expansion and contraction joint. That is, cylinder 24 can take up in an axial direction any cracks formed in the insulation, such cracks due to temperature induced expansion or contraction. Because of its construction, cylinder 24 also can absorb to a more limited degree radial expansion and contraction. Still further, resilient material may be attached to the ends of cylinder 24 to accommodate any irregularities on the inwardly facing end surfaces 44 of preinsulated pipe segments 10, 12.

Figure 4:
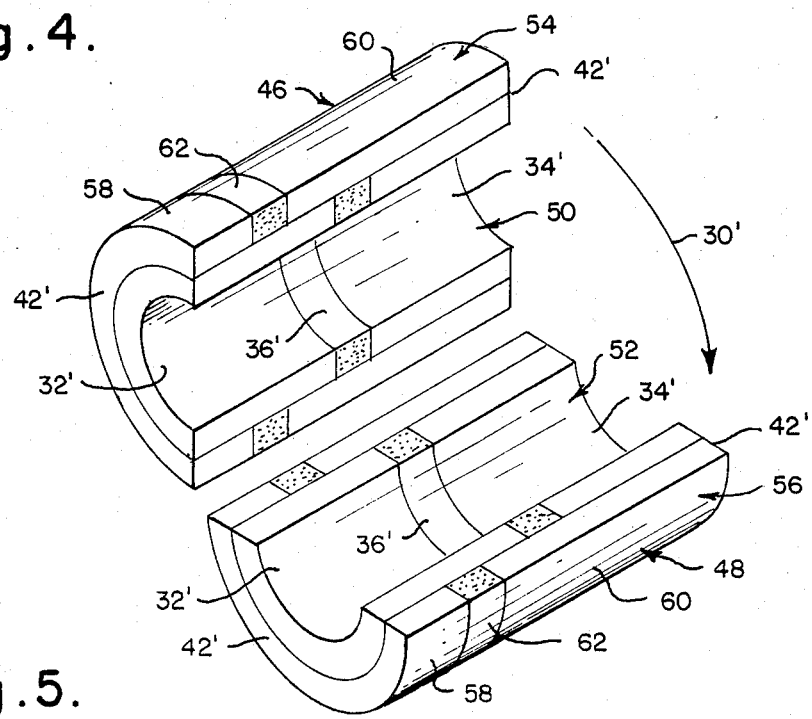
FIG. 4 is an exploded isometric view of a second embodiment of the present invention.
Figure 5:
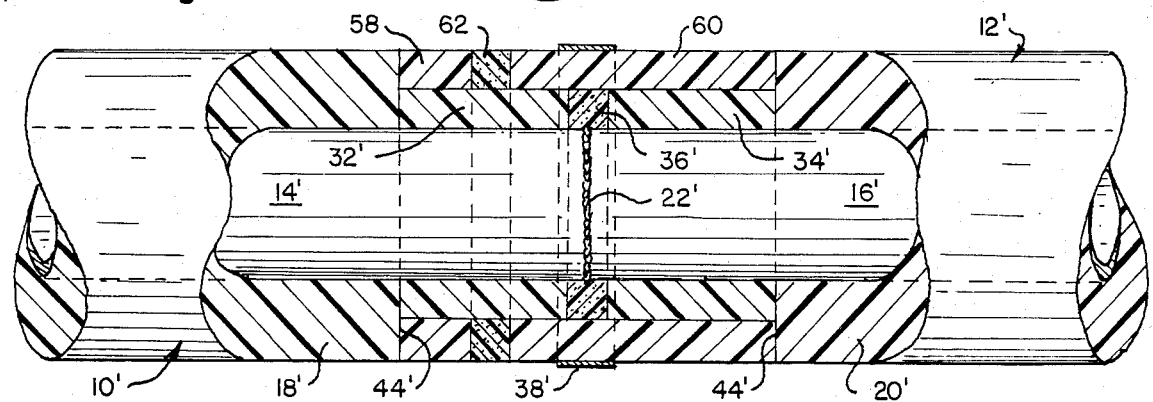
FIG. 5 is a view similar to FIG. 3 of the embodiment shown in FIG. 4.

In the embodiment just discussed, it is clear that resilient sections 36 extend radially from the pipe end portions 14, 16 to the exterior surface of cylinder 24. The insulating quality of resilient polyurethane foam is less than that of the rigid foam. Thus, the presence of resilient material across an entire radius of cylinder 24 affords the possibility of excessive heat loss from the fluid being transported. FIGS. 4 and 5 illustrate a second embodiment of the present invention intended to minimize such heat loss. In FIGS. 4 and 5, like parts to parts of the first embodiment bear identical reference numerals with a prime affixed.

As shown in FIGS. 4 and 5, cylinder segments 46, 48 of cylinder 24' are constructed in laminar form. The inner layers 50, 52 of cylinder 46, 48 are constructed (except for dimension) identical to the cylinder segments 26, 28 of the embodiment described above; that is, each layer is composed of three sections 32', 34' and 36'; sections 32', 34' being rigid and section 36' being resilient. The outer layers 54, 56 of cylinder segments 46, 48 are constructed to conform to the outside surfaces of inner layers 50, 52 and consist of three sections 58, 60, 62. Sections 58 and 60 of cylinder segment 46 are constructed of rigid molded polyurethane foam and are identically reproduced in cylinder segment 48 in diametrically opposed relationship. Sandwiched between rigid sections 58 and 60 of cylinder segment 46 is a resilient section 62 which is constructed of resilient polyurethane foam. Resilient section 62 is reproduced in cylinder segment 48 in diametrically opposed relationship. The sections 58 and 60 are joined to section 62 by means of a rubber-based adhesive.

As best shown in FIG. 4, resilient section 62 is offset from resilient section 36' in order to minimize the heat loss through the resilient polyurethane foam as discussed above. As shown in FIG. 4, resilient section 62 is offset to the left, but it will be understood that it may also be offset to the right if desired. This offsetting relationship eliminates any clear path through resilient (less insulating) material from the pipe to the outside environment.

Outer layer 54, 56 is joined to inner layer 50, 52, respectively, by means of a rubber-based adhesive placed outboard of both resilient sections 36', 62. The location of the adhesive in this manner is essential to permit cylinder segments 46, 48 to be longitudinally compressed.

The manner of installing the laminated embodiment of the present invention shown in FIGS. 4–5 on the uninsulated end portions 14, 16 of a preinsulated pipeline is identical to that described above.

What is claimed:

1. An insulation device for surrounding the combined lengths of the uninsulated, adjoining end portions of a preinsulated pipe, the end portions being so adjoined that a junction is defined thereby and the end portions having an outside diameter which is less than the outside diameter of the preinsulated pipe, comprising:
    a plurality of axially extending cylinder segments molded from an insulating material and adapted to be circumferentially joined to form a cylindrical insulating jacket around the uninsulated end portions, said cylinder segments in their undeformed states having a length slightly greater than the combined length of the uninsulated adjoining end portions;

said cylindrical insulating jacket having an inside diameter generally conforming to the outside diameter of the uninsulated end portions;

each said cylinder segment having at least a first pair of rigid arcuate sections and a first resilient arcuate section sandwiched therebetween, said first resilient arcuate sections of all said cylinder segments being longitudinally positioned in said cylindrical insulating jacket to fall substantially in the same transverse plane; and said first resilient arcuate section being made of such a resilient form of said insulating material that said first resilient arcuate sections of said plurality of cylinder segments are adapted to permit axial compression of said cylinder segments and, when said cylinder segments are so axially compressed, said first resilient arcuate sections are adapted to urge said cylinder segments to so axially expand toward resumption of their undeformed states that said cylindrical insulating jacket provides an expansion and contraction joint.

2. An insulation device as recited in claim 1 where each said cylinder segment further comprises:

a second pair of rigid arcuate sections conforming to a longitudinally extending arcuate surface of said first pair of rigid sections and first resilient section; and a second resilient arcuate section longitudinally offset from said first resilient section and sandwiched between said second pair of rigid arcuate sections, said second resilient arcuate sections of all said cylinder segments being longitudinally positioned in said cylindrical jacket to fall substantially in the same transverse plane.

3. An insulation device as recited in claim 1 wherein: said first resilient arcuate sections are longitudinally positioned to overlie the junction of the uninsulated end portions.

4. An insulation device as recited in claim 2 wherein: one of said first resilient arcuate sections or said second resilient arcuate sections are longitudinally positioned to overlie the junction of the uninsulated end portions.

5. An insulation device as recited in either of claims 1 or 2 which further comprises:

means surrounding said cylindrical jacket for securely holding said cylinder segments in place.

6. A cylindrical insulating jacket for surrounding a span of uninsulated pipe having insulation affixed thereto on opposite sides of the span, said jacket comprising:

a plurality of longitudinally extending arcuate segments constructed of insulating material, each of said arcuate segments having opposing longitudinally extending parting lines along which another of said arcuate segments is adapted to be joined to form said cylindrical insulating jacket, and each of said arcuate segments having a length slightly greater than the span; and each said arcuate segment having at least two arcuate rigid sections and an arcuate resilent section disposed therebetween, said arcuate resilient section being adapted to permit such axial compression and subsequent axial expansion of said arcuate segments that said arcuate segments are permitted to be inserted within the span in abutting relationship with the insulation on opposite sides of the span.

7. An insulation device for encasing a segment of uninsulated pipe present in a length of preinsulated pipe, the preinsulated pipe having insulation affixed thereto, said device comprising:

a cylinder constructed of insulating material, said cylinder being formed of two 180° axially extending sections, each of said 180° sections having opposing longitudinally extending parting lines along which the other of said 180° sections is joined; and resilient means disposed within said 180° sections, said resilient means being made of such a resilient form of said insulating material that said resilient means is adapted to allow axial compression and subsequent axial expansion of said 180° sections for permitting installation of said 180° sections for encasing the segment of uninsulated pipe and for permitting said cylinder to expand and contract in response to temperature induced expansion and contraction of the insulation affixed to the preinsulated pipe.

8. An insulation device as recited in claim 7 wherein: said insulating material is polyurethane foam.

9. An insulation device as recited in claim 1 wherein: said cylindrical insulating jacket has an outside diameter generally conforming to the outside diameter of the preinsulated pipe.

10. An insulation device for surrounding the combined lengths of the uninsulated, adjoining end portions of a preinsulated pipe, the end portions being so adjoined that a junction is defined thereby and the end portions having an outside diameter which is less than the outside diameter of the preinsulated pipe, comprising:

a plurality of axially extending cylinder segments molded from polyurethane and adapted to be circumferentially joined to form a cylindrical insulating jacket around the uninsulated end portions, said cylinder segments in their undeformed states having a length slightly greater than the combined length of the uninsulated adjoining end portions;

said cylindrical insulating jacket having an inside diameter generally conforming to the outside diameter of the uninsulated end portions;

each said cylinder segment having at least a first pair of rigid arcuate sections and a first resilient arcuate section sandwiched therebetween, said first resilient arcuate sections of all said cylinder segments being longitudinally positioned in said cylindrical insulating jacket to fall substantially in the same transverse plane; and, said first pair of rigid arcuate sections being made of a closed cell polyurethane and said first resilient arcuate section being made of such an open cell polyurethane that said first resilient arcuate section permits axial compression of said cylinder segments, and when said cylinder segments are so axially compressed, said first resilient arcuate section urges said cylinder segments to so axially expand toward resumption of their undeformed states that said cylindrical insulating jacket formed by said cylinder segments provides an expansion and contraction joint on the adjoining end portions of the preinsulated pipe.

11. An insulation device for surrounding the combined lengths of the uninsulated, adjoining end portions of a preinsulated pipe, the end portions being so adjoined that a junction is defined thereby and the end portion having an outside diameter which is less than the outside diameter of the preinsulated pipe, comprising:
- a plurality of axially extending cylinder segments molded from an insulating material and adapted to be circumferentially joined to form a cylindrical insulating jacket around the uninsulated end portions, said cylinder segments in their undeformed states having a length slightly greater than the combined length of the uninsulated adjoining end portions;
- said cylindrical insulating jacket having an inside diameter generally conforming to the outside diameter of the uninsulated end portions;
- each said cylinder segment having at least a first pair of rigid arcuate sections and a first resilient arcuate section sandwiched therebetween, said first resilient arcuate sections of all said cylinder segments being longitudinally positioned in said cylindrical insulating jacket to fall substantially in the same transverse plane;
- a second pair of rigid arcuate sections conforming to a longitudinally extending arcuate surface of said first pair of rigid sections and first resilient section; and
- a second resilient arcuate section longitudinally offset from said first resilient section and sandwiched between said second pair of rigid arcuate sections, said second resilient arcuate sections of all said cylinder segments being longitudinally positioned in said cylindrical insulating jacket to fall substantially in the same transverse plane.

12. An insulation device as recited in claim 11 which further comprises:
- means surrounding said cylindrical insulating jacket for securely holding said cylinder segments in place.

13. An insulation device as recited in claim 11 wherein:
- one of said first resilient arcuate sections or said second resilient arcuate sections are longitudinally positioned to overlie the junction of the uninsulated end portions.

* * * * *